United States Patent Office 3,473,930
Patented Oct. 21, 1969

3,473,930
TWO-COMPARTMENT DIAZOTYPE MATERIAL
Georg Werner and Herbert Rauhut, Wiesbaden-Biebrich, Germany, assignors, by mesne assignments, to Keuffel & Esser Company, Hoboken, N.J.
No Drawing. Filed Aug. 4, 1966, Ser. No. 570,180
Claims priority, application Germany, Aug. 7, 1965, K 56,833
Int. Cl. G03c 1/58
U.S. Cl. 96—91                                     8 Claims

ABSTRACT OF THE DISCLOSURE

Two-component diazotype material useful in the preparation of black-line diazotype copies is prepared by combining a unilaterally diazotized p-phenylene-diamine diazonium compound with a coupling component consisting essentially of a mixture of one blue-coupling compound and one yellow-coupling compound, the yellow-coupling compound being a 3-hydroxy-4-methyl-phenylamine.

---

The present invention relates to diazotype material, and particularly to improved azo coupler components useful in the preparation of two-component diazotype material.

In the light-sensitive coating of certain diazotype material, coupling components are used which couple with suitable diazo compounds to give yellow dyestuffs if development with ammonia is effected and are therefore called, in practice, yellow components. This diazotype material is preferably used for the production of intermediate originals, or the yellow components are utilized together with so-called blue components in the light-sensitive coating, in order to obtain diazotype material for the production of copies with black lines. In the latter case more than one yellow component may be included in a black-line composition, depending upon the diazonium compound and the blue component chosen. Similarly, one blue component may be sufficient, but it may be of advantage to use a combination of two or more different components. If not expressly stated otherwise, the terms "a yellow component" and "a blue component" as used in the present specification and claims shall also include a combination of several of these components.

The diazotype material according to the invention is characterized in that the light-sensitive coating contains as yellow component a phenylamine corresponding to the general formula

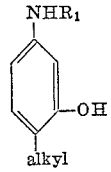

wherein $R_1$ stands for one of the groups —COCH$_3$, —CONH$_2$, —CSNH$_2$, or —CNHNH$_2$. The yellow component may be used alone or with other azo coupler compounds, e.g., blue, to provide black lines.

Preferably the alkyl group contains 1 to 4 carbon atoms. The coupling dyestuffs which are formed by the yellow components, to be used according to the invention, exhibit, depending on the diazo compound present in the light-sensitive coating, yellow, yellow-orange or brown dyestuffs. These dyestuffs cover very well, and are therefore excellently qualified for diazotype material which is to be used for the production of intermediate originals. If they are contained together with a blue component in the light-sensitive coating, the covering power of the yellow component in the black shade, which is obtained by the development with ammonia, is sufficient to obtain copies with black lines, which also produce very good intermediate originals.

The phenylamines of the above-mentioned general formula, which are to be used as yellow components according to the invention, have a good coupling activity and a good stability in storage in the presence of diazo compounds. Their good solubility in an aqueous-alcoholic medium and their good absorptive capacity on cellulose acetate materials is also to be noted.

The azo dyestuffs which are formed with the phenylamines of the above-mentioned formula have an excellent stability to migration and are, therefore, substantially different from other yellow azo dyestuffs which, especially in acetate film as support material, diffuse when stored over a longer period of time and penetrate into the upper and lower sheets when stored as superimposed sheets. This process can be accelerated and can, therefore, serve as a test, if e.g. an uncoated acetate film is put on the coated side of an acetate film on which yellow azo dyestuff has been produced by the diazotype process, and then both are pressed together between two glass plates and are kept in this condition for a week at 60° C. With azo dyestuffs formed by the coupling components of the above-mentioned formula, which are to be used according to the invention, no penetration of the dyestuff into the uncoated acetate film (diffusion) occurs.

Diazo compounds which are well suited as light-sensitive substances to be used in combination with the coupling components according to the invention are, beside others, for instance the following:

1-diazo-4-dimethylaminobenzene
1-diazo-4-diethylaminobenzene
1-diazo-4-morpholinobenzene
1-diazo-4-methylbenzylaminobenzene
1-diazo-4-diethylamino-3-methylbenzene
1-diazo-4-ethylamino-3-methylbenzene
1-diazo-4-morpholino-2,5-diethoxybenzene
1-diazo-4-morpholino-2,5-dimethoxybenzene.

As support material for the diazotype coatings of the present invention, paper, transparentized paper, paper coated with cellulose acetate, cellulose acetate films, and plastics films are preferably used; the latter, if necessary, after adequate pre-treatment.

The phenylamines corresponding to the general formula which are to be used as coupling components are simple to prepare in good yields. As starting material, 5-amino-2-alkylphenols are used, the amino group of which is converted in known manner with acid chlorides, acid anhydrides, acid esters, cyanates, thiocyanates, cyanamide or dicyandiamide. The following examples further indicate the preparation of the compounds used therein.

EXAMPLE 1

Cellulose acetate film with an acetyl content of approx. 55% is coated with the following solutions:

| | |
|---|---:|
| Water _____ml__ | 38 |
| Citric acid _____g__ | 2.6 |
| Thiourea _____g__ | 6.0 |
| 2-hydroxy-3-naphthoic-acid-beta-hydroxy-ethyl-amide _____g__ | 1.4 |
| 3-hydroxy-4-methyl-phenylurea _____g__ | 1.75 |
| Formic acid _____ml__ | 1.2 |
| Isopropanol _____ml__ | 48 |
| 1-diazo-4-diethylaminobenzene as boro-fluoride _g__ | 4.0 |

After drying the coated solution the acetate film is image-wise exposed under a pattern and developed with ammonia. A black image of the pattern with good covering power is obtained on a statisfactorily transparent background.

The 3-hydroxy-4-methylphenyl urea was obtained as follows: 8.7 g. of 4-amino-2-cresol, M.P. 158–159° C., are dissolved in 40 ml. of water at 70° C. and 8 ml. of commercial concentrated hydrochloric acid and stirred with a little activated charcoal. The mixture is filtered and to the filtrate a solution of 5.0 g. of sodium cyanate in 45 ml. of water at 35° C. is added. The formation of the urea commences at once. After stirring for half an hour, the reaction mixture is allowed to cool to room temperature and then filtered with suction. The moist suction filter cake is recrystallized from 100 ml. of boiling water with some activated charcoal and, after drying at 40–60° C., 8.2 g. of practically colorless crystals, M.P. 178–179.5° C., are obtained, corresponding to a yield of 70%.

EXAMPLE 2

Cellulose acetate film with an acetyl content of approx. 55% is coated with the following solution:

| | |
|---|---|
| Water _____ ml__ | 38 |
| Citric acid _____ g__ | 2.5 |
| Thiourea _____ g__ | 6.0 |
| 2-hydroxy-3-naphthoic acid-beta-aminoethylamide as hydrochloride salt _____ g__ | 1.3 |
| 3-hydroxy-4-methylphenylthiourea _____ g__ | 1.5 |
| Formic acid _____ ml__ | 1.2 |
| Isopropanol _____ ml__ | 48 |
| 1-diazo-4-diethylaminobenzene as boro-fluoride _g__ | 4.0 |

After drying the coated sensitizing solution, the acetate film is image-wise exposed under a pattern and developed with ammonia. A black image of the pattern with good covering power is obtained on a clear background.

With the same solution good results can be obtained if a pre-treated polyester film is used as support material. The film may be treated by subbing a surface with a cellulose acetate coating which is suitable for the absorption of diazo preparations.

The 3-hydroxy-4-methylphenylthiourea was obtained as follows: 20.4 g. of 4-amino-2-hydroxytoluene (hydrobromide salt) are dissolved in 50 ml. of hot water with 10 g. of potassium thiocyanate and evaporated to dryness on a steam bath. The residues are twice re-dissolved, each time in 150 ml. of water, and evaporated to dryness. By recrystallizing from water there are obtained colorless crystals of M.P. 181–182° C.

EXAMPLE 3

Transparent paper customarily used in diazotype processes is coated with the following solution:

| | |
|---|---|
| Water _____ ml__ | 80 |
| Citric acid _____ g__ | 4.0 |
| Thiourea _____ g__ | 5.0 |
| 3-hydroxy-4-methyl-phenyl-guanidine as hydrochloride _____ g__ | 2.95 |
| 1-diazo-4-methylbenzylaminobenzene as zinc chloride double salt _____ g__ | 5.0 |
| Glacial acetic acid _____ ml__ | 3.0 |

After drying the coated sensitizing solution, the paper is imagewise exposed under a pattern and developed with ammonia. A yellow-brown image with good covering power is obtained on a white brackground.

The 3-hydroxy-4-methylphenyl-guanidine (hydrochloride) was obtained as follows: 12.3 g. of 4-amino-2-cresol are dissolved in a mixture of 25 ml. of water and 10 ml. of commercial hydrochloric acid and heated to boiling under a reflux condenser during two hours with 4.2 g. of solid cyanamide. Then a further 0.4 g. of cyanamide are added to the reaction mixture and the mixture is boiled again for six hours. After cooling down the reaction mixture is filtered over a little quantity of animal charcoal and treated with sodium chloride. The precipitated crystals are filtered with suction and recrystallized from a small quantity of water. 11 g. of cream-colored crystals of M.P. 196–198° C. are obtained.

EXAMPLE 4

Transparent paper which is provided on one side with a cellulose acetate coating is coated on the coated side with the following solution:

| | |
|---|---|
| Water _____ ml__ | 30 |
| Tartaric acid _____ g__ | 1.5 |
| Boric acid _____ g__ | 1.5 |
| Thiourea _____ g__ | 2.0 |
| 3-hydroxy-4-methylacetanilide _____ g__ | 3.3 |
| Formic acid _____ ml__ | 5.0 |
| Isopropanol _____ ml__ | 50 |
| 1-diazo-4-morpholinobenzene as borofluoride ___ g__ | 5.0 |

After drying the coated solution, the light-sensitive material is image-wise exposed under a pattern and developed with ammonia. A brown image with a good covering power is obtained.

The compound 3-hydroxy-4-methylacetanilide was obtained as follows: 84 g. of distilled 4-amino-2-methoxytoluene are heated to boiling with 300 ml. of hydrobromic acid of 63% over 45 minutes. After adding a further 50 ml. of 63% hydrobromic acid, the reaction mixture is boiled again for three hours. After cooling, the crystal mass is filtered with suction and washed. 116.4 g. of colorless needles, corresponding to a yield of 93%, are obtained.

20.4 g. of 4-amino-2-hydroxytoluene hydrobromide are dissolved in 250 ml. of water. By adding 10 g. of sodium sulphite to the solution the free base is formed. Then 11 g. of acetic anhydride are added with vigorous stirring to effect acetylation. The acetyl compound which deposits is cooled and then filtered with suction. The yield is 17 g. The acetyl compound is difficultly soluble in water. If it is recrystallized from aqueous alcohol, the melting point is 224–226° C.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Diazotype material comprising a support and a coating thereon comprising:
   (a) a unilaterally diazotized light-sensitive p-phenylenediamine diazonium compound; and
   (b) a coupling component consisting essentially of a mixture of:
      (1) a first azo coupler compound capable of forming a blue azo dye with said diazonium compound; and
      (2) a second azo coupler compound capable of forming a yellow azo dye with said diazonium compound, said second azo coupler compound having the general formula:

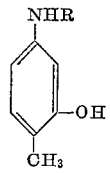

wherein R is —COCH$_3$, —CONH$_2$, —CSNH$_2$ or —CNHNH$_2$.

2. Material according to claim 1 wherein said second coupler compound is 3-hydroxy-4-methyl-phenylurea.

3. Material according to claim 1 wherein said second coupler compound is 3-hydroxy-4-methyl-phenylthiourea.

4. Material according to claim 1 wherein said second coupler compound is 3-hydroxy-4-methyl-phenyl guanidine.

5. Material according to claim 1 wherein said coupler compound is 3-hydroxy-4-methylacetanilide.

6. Material according to claim 1 wherein said first and second azo coupler compounds are present in substantially equal amounts.

7. Material according to claim 2 wherein said first coupler compound is 2-hydroxy-3-naphthoic acid-beta-hydroxy-ethylamide.

8. Material according to claim 3 wherein said first coupler compound is the hydrochloride salt of 2-hydroxy-3-naphthoic acid-beta aminoethylamide.

References Cited

UNITED STATES PATENTS

| | | | |
|---|---|---|---|
| 2,245,628 | 6/1941 | von Poser et al. | 96—91 XR |
| 2,432,549 | 12/1947 | von Glahn et al. | 96—91 |
| 2,485,122 | 10/1949 | von Glahn et al. | 96—75 |

FOREIGN PATENTS 631,896   11/1949   Great Britain.

OTHER REFERENCES

Central Research Laboratory Report No. RM168, Index of German Reports on Diazotype Research of Kalle & Co., A.G., p. 22 relied on, June 1962.

P.B. 25781 and P.B 44231, pp. 14, 179, 184, 1056 and 1127 relied on, June 1962.

NORMAN G. TORCHIN, Primary Examiner

C. BOWERS, Assistant Examiner

U.S. Cl. X.R.

96—49